United States Patent
Brown

[15] 3,669,268
[45] June 13, 1972

[54] FLUID FILTER DEVICE
[72] Inventor: Carl A. Brown, Birmingham, Mich.
[73] Assignee: Parker-Hannifin Corporation, Cleveland, Ohio
[22] Filed: April 27, 1970
[21] Appl. No.: 32,225

[52] U.S. Cl. ........................... 210/90, 116/70, 210/131, 210/DIG. 14
[51] Int. Cl. ........................................................ B01d 27/10
[58] Field of Search ............. 210/90, 91, 130, 131, DIG. 14

[56] References Cited
UNITED STATES PATENTS
3,440,802  4/1969  Rosaen et al. ................... 210/90 X Primary Examiner—Samih N. Zaharna
Attorney—Hauke, Gifford and Patalidis

[57] ABSTRACT

A fluid filter device having a housing defining a fluid chamber with first and second inlet portions connected to a fluid inlet and an intermediate portion connected to a fluid outlet. A cylindrical filter element is disposed in the intermediate portion and is so arranged that fluid flows from the inlet portions into the interior of the filter element, radially through its walls and into the intermediate portion. Pressure responsive means are provided to move the filter element in response to a predetermined pressure increase in the inlet portions to simultaneously open fluid communication between both inlet portions and the intermediate portion, whereby fluid flows from the fluid inlet to the fluid outlet bypassing the filter element at opposite ends thereof.

11 Claims, 3 Drawing Figures

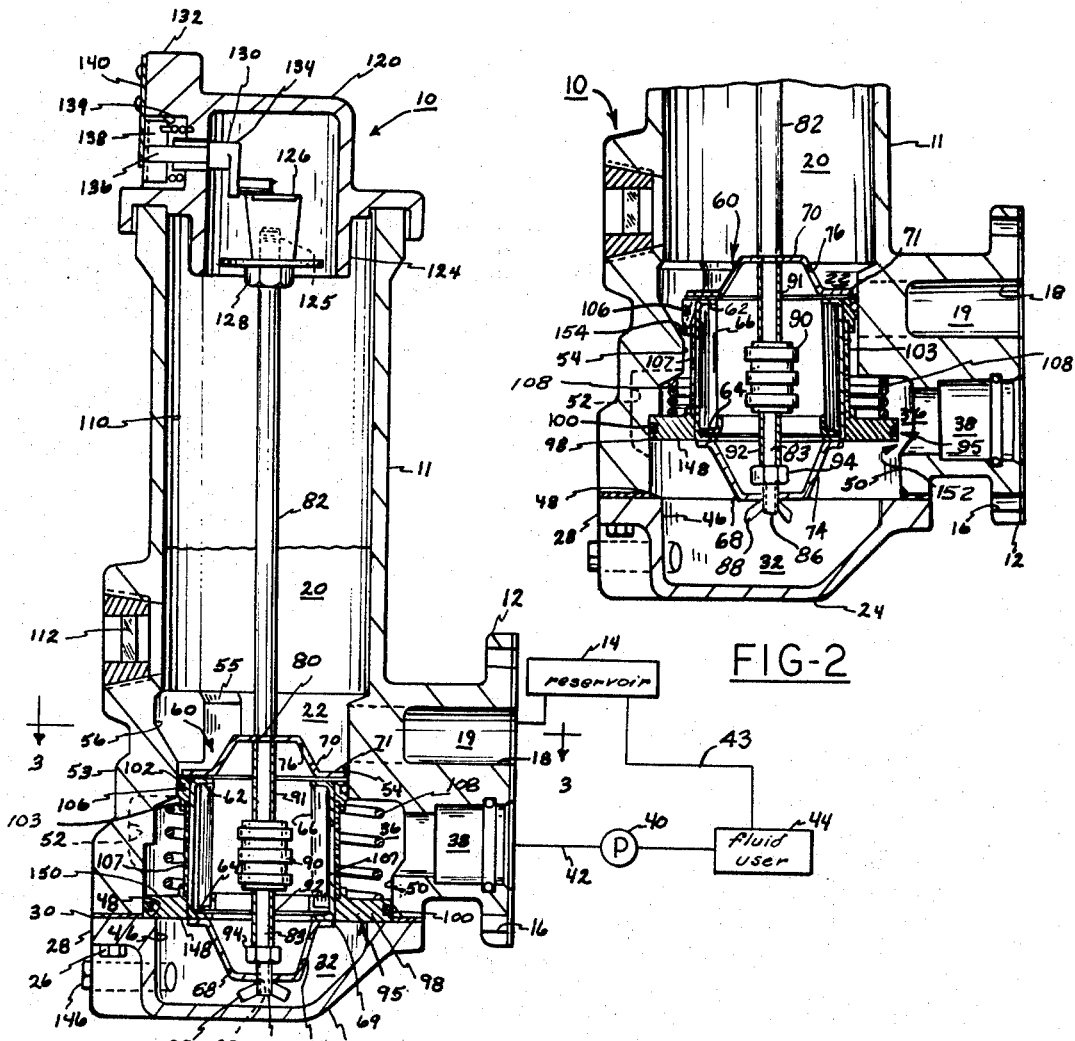
FIG-2
FIG-1
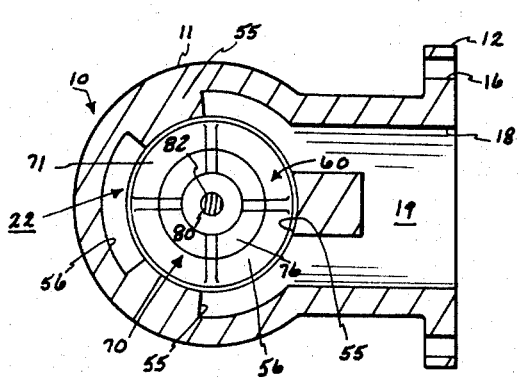
FIG-3
INVENTOR
CARL A. BROWN
BY
Hauke Gifford & Patalidis
Attorneys 3,669,268

FLUID FILTER DEVICE

BACKGROUND OF THE INVENTION

1. Field of the Invention

The present invention relates to fluid filtering devices, and, in particular, to an improvement in such fluid filtering devices of the type for filtering circulating oil as commonly used in many hydraulically actuated industrial operations, and includes means for bypassing the filter element when the same becomes clogged with filtered dirt and like foreign matter.

2. Description of the Prior Art

Hydraulic systems generally employ a fluid pump which draws fluid from a source of fluid supply and delivers the fluid under pressure throughout a fluid system for the operation of the component parts thereof, after which the fluid is returned to the source of supply to be recirculated by the fluid pump. A common practice is to install filtering devices in such systems between the source of fluid and the intake of the pump so that dirt, grit, and like foreign matter are removed from the fluid to prevent such foreign matter and the like from fouling the pump and the other component parts of the system.

In such systems, when the filter element becomes clogged with foreign matter screened from the fluid, such clogging with its subsequent reduced fluid flow must be detected and corrected before the system to which the fluid is supplied becomes starved or receives less fluid than is desirable for proper operation and protection of the system.

Heretofore, filtering devices have been constructed which have employed a bypass system which permits the fluid to bypass the filter element when the element becomes clogged from continued use; thereby preventing interference with the operation of the system due to a lack of the fluid.

Although such previously used bypass systems have functioned in an acceptable manner, it would be desirable to have the fluid bypass the filter element at a greater rate than heretofore while having the filter element so arranged that it is displaced only a minimum amount as compared to previously used devices. Such a construction would provide a more compact unit than previously possible.

SUMMARY OF THE INVENTION

The present invention which will be described subsequently in greater detail comprises a fluid filtering device having a housing with an inlet and an outlet, the interior of the housing forming a fluid chamber including first and second inlet portions, and an intermediate portion axially aligned therewith, the first and second inlet portions being fluidly connected to one another and to an inlet of the device, which in turn is adapted to be connected to a source of fluid or the like. The intermediate portion is in fluid communication with the outlet of the device, which in turn is adapted to be connected to a fluid user, such as a pump. A cylindrical filter assembly is slidably carried in the housing chamber and is normally spring biased to a position within the intermediate portion and includes a filter element and sealing elements carried at opposite ends of the filter element which engage the wall of the housing chamber to prevent fluid communication between the inlet portions and the intermediate portion, while fluid within the inlet portions flows in an axial direction into the interior of the filter element, radially through the walls of the filter element in a filtering relationship, into the intermediate portion and externally of the device by means of the outlet. The sealing element at one end of the filter element has one surface exposed to the pressure of the fluid in one of the inlet portions, while the opposite side of the sealing element is exposed to the pressure in the fluid in the intermediate portion, the filter element being movable in an axial direction in response to a predetermined increase in the pressure differential across this sealing element.

The sealing elements are disposed on the opposite ends of the filter element and are so arranged that when the filter element is displaced a predetermined amount, a flow path is opened simultaneously between the inlet portions at the opposite ends of the filter element directly with the intermediate portion such that fluid entering the device flows from the inlet portions directly to the intermediate portion bypassing the filter element.

It is therefore an object of the present invention to provide a filter device for fluid systems having means for bypassing the fluid around the filter element when the filter element becomes excessively clogged with filtered dirt; the path of flow opened by such bypassing means being substantially greater than that which has been provided in the previously described bypassing devices, while not increasing the overall size of such devices.

Other objects, advantages, and applications of the present invention will become apparent to those skilled in the art of fluid filtering devices when the accompanying description of an example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts and in which:

FIG. 1 is a longitudinal cross-sectional view of a preferred fluid filtering device incorporating the present invention and illustrating other components of a fluid system schematically;

FIG. 2 is a fragmentary view of FIG. 1 illustrating the filter element of the fluid filtering device in a bypass position; and FIG. 3 is a transverse cross-sectional view of the fluid filtering device illustrated in FIG. 1 and taken on line 3—3 thereof.

DESCRIPTION OF THE PREFERRED EMBODIMENT

Referring to the drawing and, particularly, to FIGS. 1 and 3, there is illustrated a preferred embodiment of the present invention in the form of a fluid filtering device 10 comprising a housing 11 having a flange 12 adapted to be mounted to the exterior surface of a reservoir 14 by a plurality of threaded fasteners (not shown) which extend through bores 16 within the flange 12. The flange 12 has an opening 18 which forms an inlet 19 of the fluid device 10. The fluid device 10 is mounted to the wall of the reservoir 14 at a position which will be below the normal working level of the fluid within the reservoir 14 such that the inlet 19 will be in constant fluid communication with a fluid within the reservoir 14.

The housing 11 is internally cored to define a fluid chamber which is generally indicated at 20, the top portion of which forms an upper portion 22 which registers directly with the inlet 19. A cap 24 is fastened to the bottom of the housing 11 by a plurality of threaded fasteners, only one of which is shown at 26, extending through a flange 28 into a threaded bore (not shown) within the bottom surface of the housing 11. A gasket 30 disposed at the juncture of the cap 24 and the bottom surface of the housing 11 provides a fluid tight seal between the two parts. The cap 24 is internally cored to define a lower portion 32 of the chamber 20 which is in direct fluid communication with the upper portion 22.

An intermediate portion 36 of the fluid chamber 20 disposed between the upper and lower portions 22 and 32 and in axial alignment therewith is in fluid communication with an outlet 38 formed in the flange section 16. The outlet 38 is connected to a pump 40 by means of a conduit 42. Fluid is normally drawn from the intermediate chamber 36 through the outlet 38 by means of the pump 42 for delivery to a fluid user 44 and returned therefrom to the reservoir 14 via a conduit 43. The conduit 42 is preferably disposed in the reservoir 14 and extends therethrough to a suitable fitting or the like and externally of the reservoir 14 to the pump 40 and fluid user 44.

The innermost portion of the cap flange 28 forms a rib 46 extending around the lower wall portion of the housing 11 to define a horizontally disposed annular seat 48. The lower wall portion of the housing 11 adjacent the seat 48 forms an arcuate vertical wall section 50 which terminates at an annular recess 52 formed in the wall of the housing chamber 20 within the intermediate portion 36. The annular recess 52 is in continuous fluid communication with the intermediate portion 36 and the outlet 38.

An annular section 53 of a decreased inner diameter formed by the interior of the housing 11 separates the intermediate portion 36 and the upper portion 22 and defines a second short arcuate vertical wall section 54, the lower end of the wall terminating in the intermediate portion 36, while the upper portion of the vertical wall section 54 terminates at inclined portions 56 within the interior of the housing 11 such that the upper portion 22 proximate the vertical wall 54 is enlarged with respect to the diameter of the arcuate vertical wall section 54. A plurality of ribs 55 are circumferentially spaced around the upper portion 22.

The arcuate vertical wall section 54 and the ribs 55 cooperate with the lower arcuate vertical wall section 50 to provide a vertical guideway for a filter assembly generally indicated at 60. The filter assembly 60 comprises a pair of annular flanged members 62 and 64 between which a substantially cylindrically shaped hollow filter element 66 is sandwiched. The filter assembly 60 further comprises a lower member 68 having a flange portion 69 abutting the lower surface of the flanged member 64. An upper member 70, having a configuration similar to the lower member 68, includes a flange portion 71 abutting the upper surface of the flanged member 62. The lower member 68 includes a plurality of annularly spaced openings 74 which permit fluid communication between the lower portion 32 and the interior of the filter element 66. Similarly, the upper member 70 is provided with a plurality of annular openings 76 which permit fluid communication between the upper section 22 and the interior of the filter element 66. Thus, the lower inlet portion 32 is in constant fluid communication with the inlet 19 by means of the upper inlet portion 22 and the interior of the filter element 66.

The lower member 68 and the upper member 70 are respectively provided with axial openings 78 and 80 which are preferably formed on the axis of the filter element 66. A rod 82 has a reduced diameter section 83 with a threaded end 86 which extends through the upper opening 80, the filter element 66 and through the lower opening 78 a distance sufficient to permit a lock nut 88 to be attached to the threaded end 86, thereby securing the lower member 68 to filter element 66 and the upper member 70 to rod 82. The reduced diameter section 83 of the rod 82 further carries a plurality of magnets 90 which are respectively spaced from the upper member 70 and the lower member 68 by bushings 91 and 92; the entire sub-assembly being locked together by a nut 94, as shown.

The filter assembly 60 also preferably includes a substantially cylindrically shaped sealing element 95 in which the filter element 66 is disposed. The sealing element 95 preferably comprises a radially extending annularly shaped flange 98 proximate the lower flanged member 64, a radially extending flange 102 proximate the upper flange member 12 and a perforated cylindrical member 103 joining the flanges 98 and 102. The bottom portion of the outermost end of the flange 98 is adapted to abut the top of the seat 48. The flange 98 preferably has an outer diameter corresponding to the inner diameter of the wall 50 and carries a piston ring 100 which slidably engages the surface of the wall 50 in a fluid sealing relationship. The flange 102 has an outer diameter corresponding to the inner diameter of the vertical wall 54 and the ribs 55, and is likewise provided with a piston ring 106 which slidably engages the surface of the wall 54 in a fluid sealing relationship. The cylindrical member 103 is provided with a plurality of annularly spaced apertures 107 to permit unrestricted fluid flow between the outer surface of the filter element 66 and the intermediate chamber 36.

During normal operation, it is desired that the filter assembly 60 be positioned such that the flange 100 is normally seated against the seat 48. To insure that the filter assembly 60 is in the normally seated position, a coil spring 108 is disposed between the underside of the annular section 53 and the upper surface of the radially extending flange 98, thus normally biasing the filter assembly 60 towards its seated position. The manner in which the filter assembly 60 is unseated and the manner in which the filter element 66 is bypassed will be described in greater detail hereinafter.

The upper portion of the housing 11 takes the form of an elongated tubular member 110 preferably having a sight glass 112 provided in one wall thereof above the filter chamber 22. The sight glass 112 is preferably disposed at a height corresponding to a minimum fluid level in the system, the level being above the fluid outlet 38 such that air will not be introduced into the system through the outlet 38.

A cap 120 closes off the upper end of the tubular member 110 and is removably secured thereto by a plurality of threaded fasteners (not shown). The cap 120 includes an inner, downwardly extending cylindrical section 124 which encompasses the upper end of the rod 82. An inverted truncated shaped knob 126 is carried on a threaded end 125 of the rod 82 and is locked thereon by a nut 128. The upper end of the knob 126 is adjusted to engage an actuating pin 130 which is horizontally journaled for rotation in a boss portion 132 of the cap 120. The inner end of the actuating pin 130 is provided with a pair of right angle bends 134 so that a vertical movement of the knob 126 produces a rotation of the actuating pin 130. The outer end of the actuating pin 130 is reduced, as at 136, and carries a pointer element 138 at the extreme end thereof. The pointer 138 is disposed in a recessed portion 139 of the boss 132 and points to suitable indicia (not shown) provided on an indicator plate 140. The pointer element 138 is rotated by the pin 130, and thus with suitable indicia the condition of the filter element 66 can be indicated in a manner which will be more apparent as the description proceeds.

The housing 11 further includes a drain plug 146 in the cap 24, which is provided for the purpose of removing sediment and other foreign matter which may accumulate in the lower portion 32 of the cap 24. The drain plug 146 permits removal of the accumulated sediment even while the system fluid is flowing through the filter assembly 60 with a minimum loss of fluid.

As the invention has thus far been described, fluid is normally drawn from the reservoir 14 by the suction of the pump 40 through the inlet 19, into the upper portion 22 of the chamber 20 and down through the interior of the filter element 66, filling the lower portion 32. The fluid flows in a filtering relationship radially through the filter element 66 into the intermediate chamber 36, through the outlet 38 to the conduit 42 for discharge from the pump 40 to the fluid user 44 whereupon the used fluid is returned to the reservoir 14 via conduit 43.

As the filter element 66 becomes clogged, it produces an increase in pressure on the inlet side of the filter element 66 resulting in a pressure differential between the inlet 19 and the outlet 38. This increased inlet pressure is reflected in the lower chamber portion 32 and acts against a lower surface 148 of the flange 98 to urge the filter assembly 60 in an upward axial direction, while the pressure of the fluid within the intermediate chamber 36 on the outlet side acts against the opposite side 150 of the flange 98 to oppose the upward axial movement of the filter assembly 60. As the pressure differential increases, the resultant force acting on the filter assembly 60 gradually increases to the point where it overcomes the normal downwardly directed force of the spring 108 so that the filter assembly 60 including the sealing element 95 is carried axially upwardly. The spring 108 is chosen of a sufficient stiffness to correspond to a predetermined clogged condition of the filter element 66 so that when the filter element 66 reaches this clogged condition the filter assembly 60 will have risen a vertical distance sufficient for the lower portion of the sealing element flange 98 and the lower portion of the sealing element flange 102 to both simultaneously clear the top portions of the walls 50 and 54 respectively, thereby permitting direct fluid flow from the lower portion 32 into the intermediate portion 36, and from the upper portion 22 into the intermediate portion 36 through flow paths 152 and 154 (FIG. 2) respectively defined by the annular opening created between the inner diameter of the wall 50 and the outer diameter of the sealing element flange 98 at the lower end of the filter assembly 60 and by arcuately spaced openings created between the inner diameter of the wall 54 and ribs 55 and the outer diameter of the sealing element flange 102 at the upper end of the filter assembly 60. Thus, the fluid entering the inlet 19 and flowing into the upper portion 22 and the lower portion 32 will simultaneously bypass the filter element 66 and flow directly around the exterior of the filter element 66 into the intermediate chamber 36 and externally of the filtering device 10 by means of the outlet 38.

As the filter assembly 60 moves from a filtering position to a bypass position, the upward movement of the rod 82 and the engagement of the knob 126 with the actuating pin 130 will produce a rotation of the actuating pin 130 and the pointer element 138. Since the degree of rotation of the actuating pin 130 is associated with the movement of the rod 82 and therefore the condition of the filter assembly 60 and since the indicia on the indicator plate 140 corresponds to the degree of rotation of the actuating pin 130 a visual indication of the condition of the filtering element 66 may be had by an attendant.

When the filter element 66 has become clogged to a degree that fluid is bypassing the filter element 66 it is necessary that the filter element 66 be removed for the purposes of either cleaning or replacement. This may be accomplished while the fluid system continues to operate by removing the cap 120 and grasping the knob 126 to pull the filter element 66 vertically upwardly separating the filter element 66 from the cylindrically shaped sealing element 95. The filter element 66 is pulled vertically upwardly through the tubular member 110 and externally of the housing 11. Thus the removal of the filter element 66 is accomplished by simply lifting the filter element 66 from an active filtering engagement with the fluid within the housing 11. A clean filter element 66 is inserted between the annular flange member 62 and 64 and inserted within the sealing element 95 in the reverse manner in which it was withdrawn. It can thus be seen that the removal and replacement of the filter element does not disturb the operation of the fluid system since fluid will continue to flow from the inlet 19 directly to the outlet 38.

It can thus be seen that the present invention has provided a filtering device having a filter assembly therein which is movable from its normal filtering position to a position to permit bypassing thereof from opposite sides, and thus permitting a substantial increase in the amount of bypass flow previously obtainable in the heretofore described prior art filtering devices, while not having to increase the overall dimensions of such previously used filtering devices.

Although only one embodiment of the present invention has been described, it is apparent that many changes can be made therein without departing from the spirit of the invention as expressed by the scope of the appended claims.

What is claimed is as follows:

1. A device for filtering fluid, comprising:
   a housing having an inlet and an outlet, the interior of said housing having a chamber including first and second inlet portions;
   means for fluidly connecting said first inlet portion with said inlet;
   an intermediate portion disposed between said first and second inlet portions and in fluid communication with said outlet;
   a filter assembly including a cylindrical filter element slidably carried in said housing chamber and normally disposed within said intermediate portion, first and second axially spaced sealing means associated with the opposite ends of the filter assembly, said sealing means being disposed between said filter assembly and said housing to normally preclude direct fluid communication between said inlet portions and said intermediate portion, the opposite ends of said filter element respectively registering with said first and second inlet portions such that the fluid in said first inlet portion flows axially through the interior of said filter element, into said second inlet portion, and then radially through the walls of said filter element and into said intermediate portion when said filter element is in said normal position; and
   pressure responsive means having one side exposed to the pressure of the fluid in one of said inlet portions and having a side opposite to said first side exposed to the pressure of the fluid in said intermediate portion, said filter element being movable in response to a predetermined increase in the pressure differential across said pressure responsive means to simultaneously open fluid communication between said first inlet portion and said intermediate portion proximate one end of said filter element, and open fluid communication between said second inlet portion and said intermediate portion proximate the other end of said filter element whereby the fluid flows from said inlet to said outlet, bypassing said filter element.

2. The filtering device defined in claim 1 wherein said sealing means comprises a first sealing element carried at the end of said filter element associated with said first inlet portion and slidably engaging the wall of said chamber in a fluid sealing relationship; a flange carried at the end of said filter element associated with said second inlet portion, said flange having a second sealing element carried thereon and slidably engaging the wall of said chamber in a fluid sealing relationship, said first and second sealing elements being concentric with their associated chamber walls such that said filter element is movable with respect to said chamber walls in an axial direction.

3. The filtering device defined in claim 2, including first and second openings respectively in the walls of said first inlet portion and said intermediate portion, said intermediate portion being in fluid communication with said first inlet portion via said first opening when said first mentioned sealing element traverses said first opening; and said intermediate portion being in fluid communication with said second inlet portion via said second opening when said second sealing element traverses said second opening.

4. The filtering device defined in claim 3, wherein said one side of said pressure responsive means is exposed to the pressure of the fluid in said second inlet portion.

5. The filtering device defined in claim 4, including a second pressure responsive surface carried by said filter element and having one side exposed to the pressure of the fluid in said first inlet portion, the pressure in said first inlet portion exerting a force on said second pressure responsive means urging said filter element in a direction which is opposite to the direction which said first mentioned pressure responsive means urges said filter element.

6. The filtering device as defined in claim 5, wherein the effective area of said first pressure responsive means is greater than the effective area of said second pressure responsive means.

7. The filtering device defined in claim 3, wherein said first inlet portion and said second inlet portion are respectively in fluid communication with said intermediate portion by means of first and second flow paths formed as said first and second sealing means respectively traverse said first and second openings, said second flow path being of a greater cross-sectional area than said first flow path.

8. The fluid device defined in claim 6, wherein said one side of said first pressure responsive means is formed on said flange; a seat formed in said intermediate portion, said one side of said flange abutting said seat to limit the amount of axial movement of said filter element into said second inlet portion, and including means normally biasing said flange into abutment with said seat, said filtering element being in said normal position when said one side of said flange is in abutment with said seat.

9. The filtering device defined in claim 8, wherein said biasing means comprises a spring disposed in said intermediate portion, one end of said spring abutting said opposite side of said flange, the other end of said spring being carried by a portion of said chamber wall.

10. The filtering device defined in claim 8, wherein said filter element is shiftable in an axial direction toward said first inlet portion as said first and second sealing elements respectively traverse said first and second openings.

11. The filter device defined in claim 10, including means operatively connected to said filter element to visually indicate the position of said filter element exteriorly of said filtering device.

* * * * *